United States Patent [19]

Noguchi et al.

[11] Patent Number: 5,360,825
[45] Date of Patent: Nov. 1, 1994

[54] PULP MOLDING

[75] Inventors: Tsutomu Noguchi; Mayumi Miyashita, both of Kanagawa, Japan

[73] Assignee: Sony Corporation, Tokyo, Japan

[21] Appl. No.: 16,266

[22] Filed: Feb. 11, 1993

[30] Foreign Application Priority Data

Feb. 14, 1992 [JP] Japan .................... 4-059130

[51] Int. Cl.$^5$ .................... C08J 9/236; C08J 9/32
[52] U.S. Cl. .................... 521/54; 521/55; 521/84.1; 536/20
[58] Field of Search .................... 521/54, 55, 84.1; 536/20

[56] References Cited

U.S. PATENT DOCUMENTS

| | | | |
|---|---|---|---|
| 4,046,404 | 9/1977 | Trier | 428/327 |
| 4,477,518 | 10/1984 | Cremona et al. | 428/327 |
| 4,837,200 | 6/1989 | Kondo et al. | 428/195 |
| 5,125,996 | 6/1992 | Campbell et al. | 428/158 |

*Primary Examiner*—Morton Foelak
*Attorney, Agent, or Firm*—Hill, Steadman & Simpson

[57] ABSTRACT

A pulp molding is formed by molding a feedstock consisting of, as principal components, pulp and some binder. The feedstock contains plastic microspheres which form uniformly distributed voids in the pulp molding. The pulp molding has cushioning characteristics higher than those of the conventional pulp molding and equivalent to those of a foam styrene board, and moisture absorbing characteristics lower than those of the conventional pulp molding. The pulp molding can be deflocculated in water for reclamation without causing environmental pollution.

11 Claims, 6 Drawing Sheets

PULP MOLDING

BACKGROUND OF THE INVENTION

1. Field of the Invention

The present invention relates to a pulp molding and, more particularly, to a pulp molding alternative to foam styrene resin materials.

2. Description of the Related Art

Packings of foam styrene resin having excellent cushioning characteristics have been used in packing electric apparatus including television sets and video tape recorders. However, environmental pollution attributable to waste packings of foam styrene resin have become a serious problem because foam styrene resin is unperishable and undecomposable in soil and produces noxious gases when incinerated. Accordingly, the development of pollution-free packing materials alternative to foam styrene resin packing materials has been desired. One of the remarkable alternative packing materials is a pulp molding formed by molding a feedstock produced by processing waste paper, such as newspaper, as a principal raw material, and pulp packings formed by molding pulp materials have been used for packing small electric apparatus including cassette tape recorders.

A pulp molding currently used as a pulp packing contains, as principal components, pulp and a vinyl acetate copolymer containing ethylene serving as a synthetic binder. This vinyl acetate copolymer is used widely for paint and adhesives. The material of the pulp molding contains the synthetic binder to enhance the water resistance of the pulp molding. Generally, the pulp molding contains 8% by weight synthetic binder. However, the cushioning property of the pulp molding formed of the conventional material is not sufficiently high and such a pulp molding is not suitable for packing large electric apparatus including television sets and video tape recorders.

If the vinyl acetate resin content of the pulp molding is 8% by weight to reduce the hygroscopicity of the pulp molding, it is difficult to deflocculate the pulp molding for reclamation because the binder is difficult to resolve in water. Furthermore, the effect of the binder on the reduction of the hygroscopicity of the pulp molding is insignificant; for example, while the moisture percentage of a pulp molding not containing any binder is 10.8% when the same is kept for a predetermined time in an environment of a temperature of 60° C. and a relative humidity of 80%, the moisture percentage of the pulp molding containing 8% by weight binder kept in the same environment is 9%. Thus, the physical properties of the pulp molding are liable to deteriorate in a high-temperature high-humidity environment.

SUMMARY OF THE INVENTION

Accordingly, it is an object of the present invention to provide a pulp molding having satisfactory cushioning characteristics and a low hygroscopic property and capable of being readily processed for reclamation without entailing environmental pollution.

A pulp molding in one aspect of the present invention is formed by molding a feedstock containing pulp as a principal component, a small quantity of binder, and plastic microspheres.

Preferably, the feedstock contains additives of a pulp plasticizer and rosin size.

Furthermore, preferably, the binder is a polymer emulsion and a water soluble bio-degradable.

The feedstock containing pulp as a principal component, a small quantity of binder and the heat-expandable microcapsules is molded to obtain, for example, a pulp packing material. When heated at a high temperature, the heat-expandable microcapsules formed of a polymer soften, and the hydrocarbon contained in the heat-expandable microcapsules gasifies and the heat-expandable microcapsules expand in a volume several tens times the initial volume thereof. The expanded heat-expandable microcapsules have a specific gravity of 0.5 or below and is capable of elastic deformation. Accordingly, voids can be formed in the pulp molding when the feedstock contains only a small quantity of the heat-expandable microcapsules and the voids formed in the pulp molding absorb shocks, which invests the pulp molding with improved cushioning characteristics.

The pulp plasticizer, such as glycerol, improves the cushioning characteristics of the pulp molding.

The binder such as chitosan improves the mechanical properties of a pulp mold. The rosin size added to the feedstock reduces the hygroscopic characteristic of the pulp mold. The rosin size is produced by synthesis using natural colophony as a raw material. Therefore, the rosin size, as compared with the synthetic vinyl acetate binder, is less pollutive to the environment. Since the rosin size is not a synthetic resin, the pulp molding containing the rosin size can be deflocculated in water for reclamation and hence the pulp molding will not entail environmental pollution.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

First Embodiment

A material for forming pulp moldings in the first embodiment includes a pulp slurry a solid content of 24% as a principal component, a vinyl acetate emulsion as a binder, and heat-expandable microcapsules containing an organic solvent having a low boiling point (Microcapsules F-80S, Matsumoto Yushi K.K.).

The heat-expandable microcapsules are heated at 160° C. to make the same fully expand in a mean particle diameter of about 100 μm. Then, a predetermined quantity of expanded microcapsules are added to the vinyl acetate emulsion of 5% by weight vinyl acetate concentration based on the weight of pulp, and ultrasonic waves are applied to the mixture of the vinyl acetate emulsion and the expanded microcapsules to disperse the expanded microcapsules in the vinyl acetate emulsion. Then, the mixture and the pulp slurry are mixed to prepare a feedstock. The feedstock is dried in a mold by heating at a temperature of 100° C. to form a pulp molding.

An acrylic resin emulsion, a water soluble cellulose derivatives may be used as the binder instead of the vinyl acetate emulsion.

The microcapsules are formed of a thermoplastic resin, such as a copolymer of vinylidene chloride, acrylonitrile and methacrylic ester, and contains an organic solvent (inflating agent) of a low boiling point in the range of 50° C. to 100° C., such as isobutane, pentene, petroleum other or hexane. The diameter of the heat-expandable microcapsules before expansion is in the range of 10 to 30 μm. When heated at a relatively low temperature in the range of 100° to 150° C. for a short time, the heat-expandable microcapsules expand and the expanded microcapsules have diameters four to five times those of the heat-expandable microcapsules and volumes fifty to hundred times those of the heat-expandable microcapsules. Satisfactory heat-expandable microcapsules can be produced by using an optimum quantity of inflating agent having an optimum boiling point and an optimum construction, and microcapsules having an optimum mean particle diameter, an optimum particle size distribution, optimum elongation and strength under heat, imperviousness to gas and optimum solvent resistance.

General properties and characteristics of the heat-expandable microcapsules will be described hereinafter. The heat-expandable microcapsules have the appearance of white powder, moisture content of 2% or below, a true specific gravity in the range of 0.015 to 0.025, a range of particle size distribution in the range of 30 to 200 μm, a mean particle size of about 100 μm and a compressive strength of 300 kg/cm² or above, and are formed of a material containing acrylonitrile as a principal component.

The true specific gravity of the heat-expandable microcapsules is smaller than that of a conventional filler and the addition of a small quantity of the heat-expandable microcapsules enables forming a lightweight pulp molding. Having the shape of a true sphere, plasticity and elasticity, the heat-expandable microcapsules can be readily mixed in the vehicle and capable of absorbing stress. Since the heat-expandable microcapsules incinerate, only voids can be formed in the pulp molding, if necessary, by removing the heat-expandable capsules by sintering. Moreover, the heat-expandable microcapsules has a high heat resistance and their flow temperature is as high as about 130° C.

Measured specific gravities of pulp moldings formed by molding feedstocks prepared by the foregoing procedure for different expanded microcapsule contents based on pulp are shown in Table 1.

TABLE 1

| Content of expanded microcapsules (wt. %) | Specific gravity (g/cm³) |
|---|---|
| 0 | 0.83 |
| 5 | 0.54 |
| 10 | 0.45 |

As is evident form Table 1, the specific gravity decreases with the increase of the expanded microcapsule content, which proves that voids are formed in the pulp moldings by the expanded microcapsules. The pulp molding containing 10% by weight expanded microcapsules based on pulp has a specific volume about 1.4 times that of the conventional pulp molding not containing any expanded microcapsules.

Test specimens of the pulp moldings thus formed were subjected to compression tests to evaluate their static cushioning characteristics. The test specimens were sampled from pulp moldings containing expanded microcapsules in contents of 0.5%, 7.5% and 10% by weight, respectively, and a pulp molding containing the expanded microcapsules in a content of 10% by weight, and glycerol as a plasticizer. Foam styrene material having a specific gravity of 0.02 was used as a comparative test specimen. The size of the test specimens is 20 mm×20 mm×10 mm and the test specimens were compressed at a compression rate of 5 mm/min.

Figure 1:
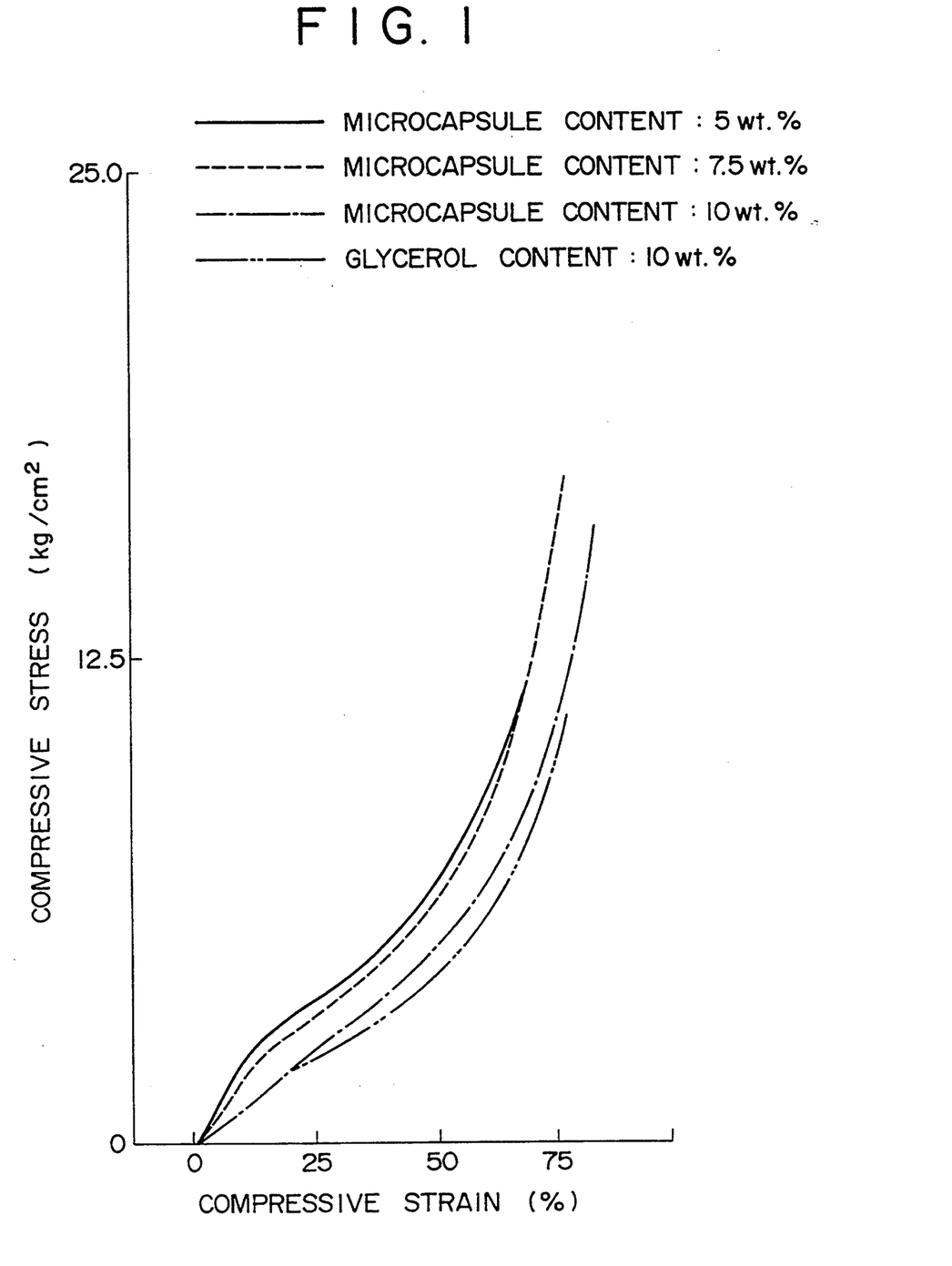
FIG. 1 is a graph showing the measured variation of compressive stress with compressive deformation ratio for pulp moldings formed of feedstocks differing from each other in composition in a first embodiment according to the present invention.
Figure 2:
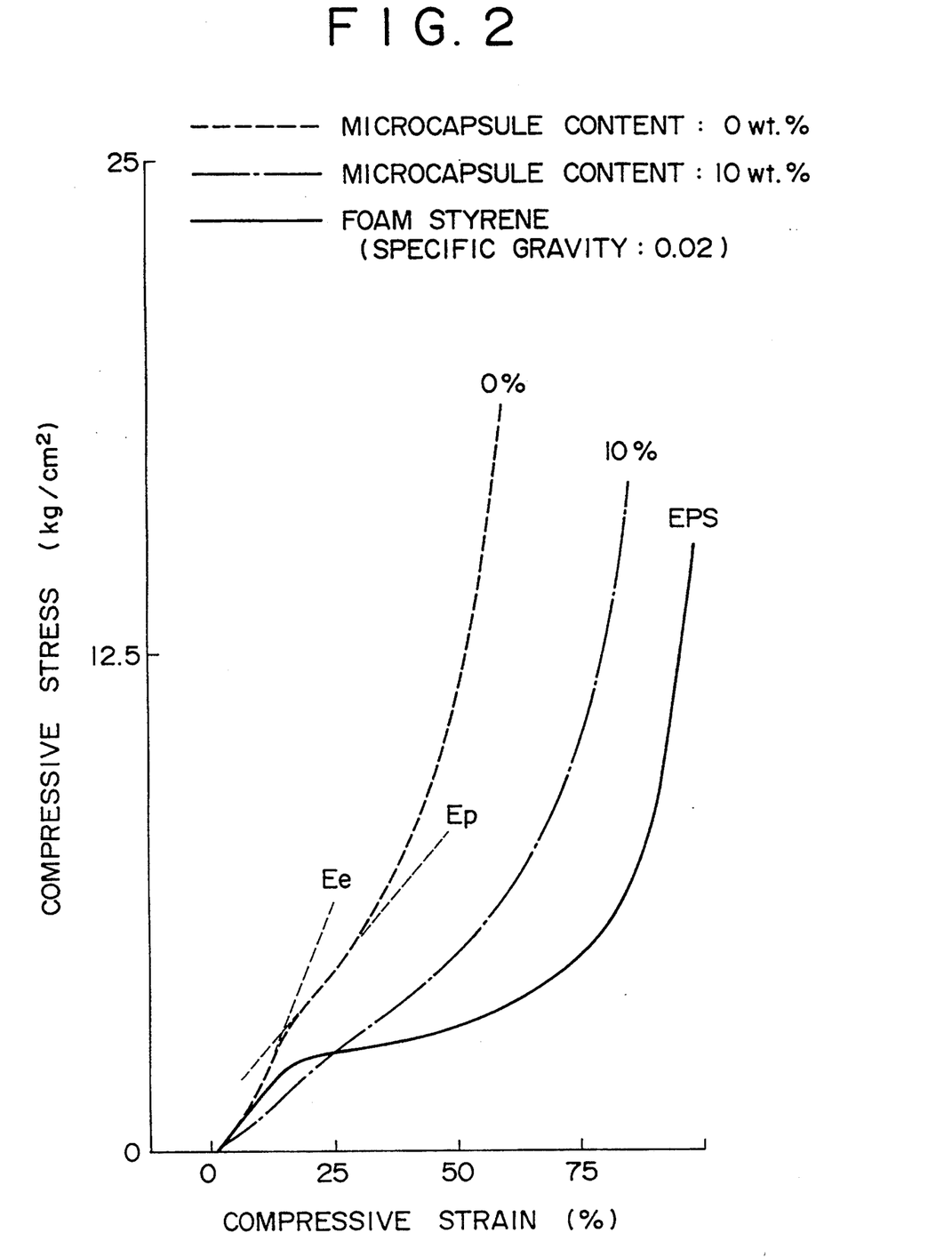
FIG. 2 is a graph showing the measured variation of compressive stress with compressive deformation ratio for pulp moldings in the first embodiment according to the present invention and comparative examples.

FIGS. 1 and 2 show the measured results of the relation between compressive stress and compressive strain for different expanded microcapsule contents. As is obvious from FIG. 1, the elastic modulus Ee and the plastic deformation ratio Ep and stress σ for corresponding strain decrease with increase in the expanded microcapsule content, which proves that the expanded microcapsules improve the cushioning characteristics of the pulp moldings. As is obvious from FIG. 2, the compressive stress for a compressive strain of 25% is reduced by 45% by the expanded microcapsules contained in a content of 10% by weight, and the compressive stress of the pulp molding containing 10% by weight expanded microcapsules is equal to that of the foam styrene material of 0.02 in specific gravity. Although the addition of the expanded microcapsules in a content of 2% by weight based on pulp is effective on the improvement of the cushioning characteristics of the pulp moldings, the addition of the expanded microcapsules in a content in the range of 5 to 10% by weight will be sufficiently effective.

Figure 3:
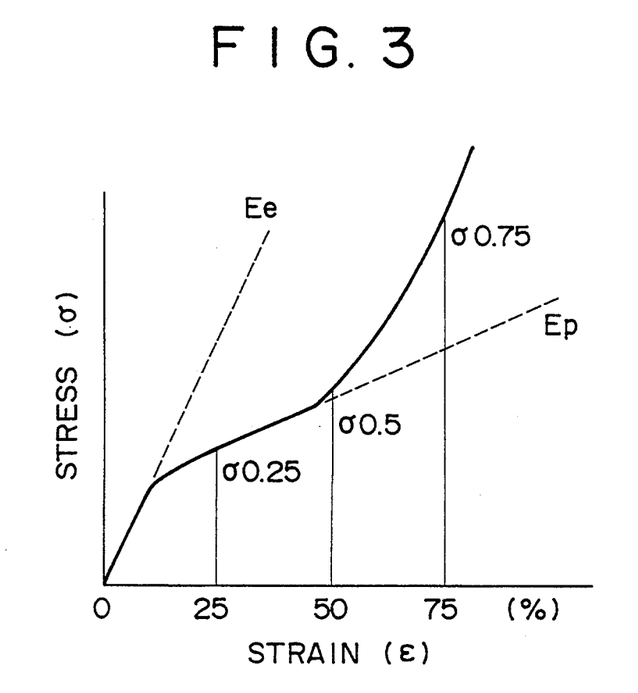
FIG. 3 is a graph of assistance in explaining the definition of Ee and Ep in the first embodiment.

FIG. 3 illustrates the definition of the elastic modulus Ee and the plastic deformation ratio Ep. In FIG. 3, σ0.25, σ0.50 and σ0.75 are compressive stresses for compressive strains of 25%, 50% and 75%, respectively.

Figure 4:
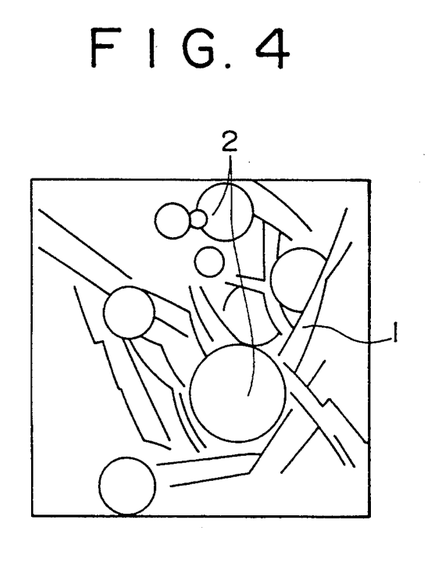
FIG. 4 is a typical view showing the state of a test piece of a pulp molding in the first embodiment after compression at a compressive deformation ratio of 75%.
Figure 5:
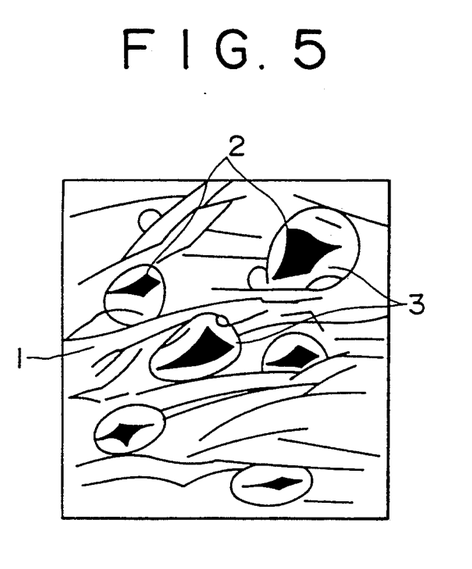
FIG. 5 is a typical view showing the state of a test piece of a pulp molding in the first embodiment after compression at a compressive deformation ratio of 75%.

FIGS. 4 and 5 are typical views of photographs of the test specimen taken before compression and after compression for a compressive strain of 75%, respectively, taken by a SEM (scanning electron microscope). In FIGS. 4 and 5, indicated at 1 is pulp, at 2 are expanded microcapsules and at 3 are crushed expanded microcapsules. It is known from FIGS. 4 and 5 that the compressive deformation of the expanded microcapsules is effective on the improvement of the cushioning characteristics of the pulp moldings.

Values of Ee, values of Ep, compressive stresses $\sigma 0.25$ and $\sigma 0.50$ induced in the test specimens for different expanded microcapsule contents, and those of the comparative examples, i.e., the pulp molding containing 10% by weight expanded microcapsules and glycerol, and the foam styrene material.

TABLE 2

| Expanded microcapsule content (wt. %) | Ee (kg/cm$^2$) | Ep (kg/cm$^2$/%) | Stress (kg/cm$^2$) | |
|---|---|---|---|---|
| | | | $\sigma 0.25$ | $\sigma 0.50$ |
| 0 | 27.5 | 13.2 | 4.8 | 11.3 |
| 5.0 | 23.4 | 9.4 | 3.4 | 6.3 |
| 7.5 | 18.8 | 9.4 | 3.1 | 5.9 |
| 10.0 | 12.5 | 8.6 | 2.5 | 5.0 |
| 10.0 and glycerol | 10.9 | 7.0 | 2.2 | 4.2 |
| Foam styrene material | 14.9 | 3.8 | 2.5 | 3.1 |

As is evident from Table 2, when the expanded microcapsule content of the pulp moldings is 10% by weight based on pulp, the pulp moldings have Ee and compressive characteristics at $\sigma 0.25$ substantially equal to those of foam styrene material. It is known also from Table 2 that glycerol added to the pulp molding in a glycerol content of 10% by weight based on pulp reduces the compressive stress $\sigma 0.25$ and Ee to values nearly equal to those for the foam styrene material. Glycerol added to the pulp molding in a glycerol content of 5% by weight or above based on pulp is effective and preferable-glycerol content based on pulp is in the range of 5 to 50% by weight, because an excessive quantity of glycerol deteriorates the water resistance of the pulp moldings.

The pulp moldings in the first embodiment were formed by molding the feedstock containing pulp and the expanded microcapsules. It is also possible to form pulp moldings having satisfactory cushioning characteristics by molding a feedstock containing pulp and expandable microcapsules and heating the pulp molding after molding.

Thus, the pulp moldings in the first embodiment are superior to the conventional pulp moldings in cushioning characteristics, and capable of substituting foam styrene packings and of preventing environmental pollution.

Second Embodiment

A material for forming pulp moldings in the second embodiment is prepared by dispersing heat-expandable microcapsules formed of an acrylonitrile resin having mean particle diameter of about 100 $\mu$m (F-80, Matsumoto Yushi K.K.) by ultrasonic waves in an aqueous solution of a binder containing a predetermined quantity of rosin size (Sizepine E, Arakawa Kagaku Kogyo K.K.) and a predetermined quantity of aluminum sulfate, and mixing the aqueous solution of binder and a pulp slurry of 24% by weight solid concentration.

The feedstock was poured in a mold and heated at 100° C. to form pulp moldings and test specimens were sampled from the pulp moldings.

The moisture absorbing properties of the test specimens were examined. The test specimens of 20 mm × 20 mm × 10 mm were kept in an environment of a temperature of 60° C. and a relative humidity of 80% for twenty-four hours. Then, the test specimens were subjected to vacuum drying at 100° C. for about five hours to determined the quantity of water contained in the test specimens.

Table 3 shows the measured moisture percentage of each test specimen. The heat-expandable microcapsule content of the pulp moldings is 10% by weight based on pulp, and the rosin size content of the same is 2% by weight based on pulp.

TABLE 3

| Test specimens | Moisture percentage (wt. %) |
|---|---|
| Conventional pulp molding (8% Vinyl acetate) | 9.0 |
| Pure pulp molding (Not containing any binder) | 10.8 |
| Pulp molding (Containing 10% by weight expanded microcapsules not containing any binder) | 8.9 |
| Pulp molding (Containing 10% by weight expanded microcapsules and 2% by weight rosin size) | 5.7 |

As is obvious from Table 3, the moisture percentage of the pulp molding containing 10% by weight expanded micro-capsules and not containing any binder is substantially equal to that of the conventional pulp molding, and a small quantity of rosin size, i.e., 2% by weight rosin size, reduces the moisture percentage. A rosin size obtained by processing natural colophony, in particular, is highly adhesive to pulp and only a small quantity of rosin size reduces the moisture percentage of the pulp moldings effectively.

The test specimens were subjected to compression tests, in which the relation between the compressive stress and the compressive strain of the test specimens were measured before and after keeping the test specimens in a humid environment of 60° C. in temperature and 80% in relative humidity for twenty-four hours. The compression tests proved that the elastic modulus Ee of the conventional pulp moldings decreased about 10% when the conventional pulp moldings were kept in the humid environment whereas the elastic modulus Ee of the pulp moldings containing the rosin size decreased only 2 to 3%.

Moisture contents of pulp moldings containing the expanded microcapsules in a content of 10% by weight based on pulp and respectively differing in rosin size content were measured to determine the dependence of moisture percentage on the rosin size content. Measured results are shown in Table 4.

TABLE 4

| Rosin size content (wt. %) | 0 | 0.5 | 2.0 | 5.0 |
|---|---|---|---|---|
| Moisture percentage (%) | 8.9 | 6.4 | 5.7 | 5.7 |

As shown in Table 4, the rosin size contained in a content of 2% by weight in the pulp moldings is sufficiently effective on the reduction of moisture percentage; that is, the moisture percentage of the pulp molding containing 2% by weight rosin size is as low as 5.7%, which is lower than that of the pulp molding not containing the rosin size by 35%.

Figure 6:
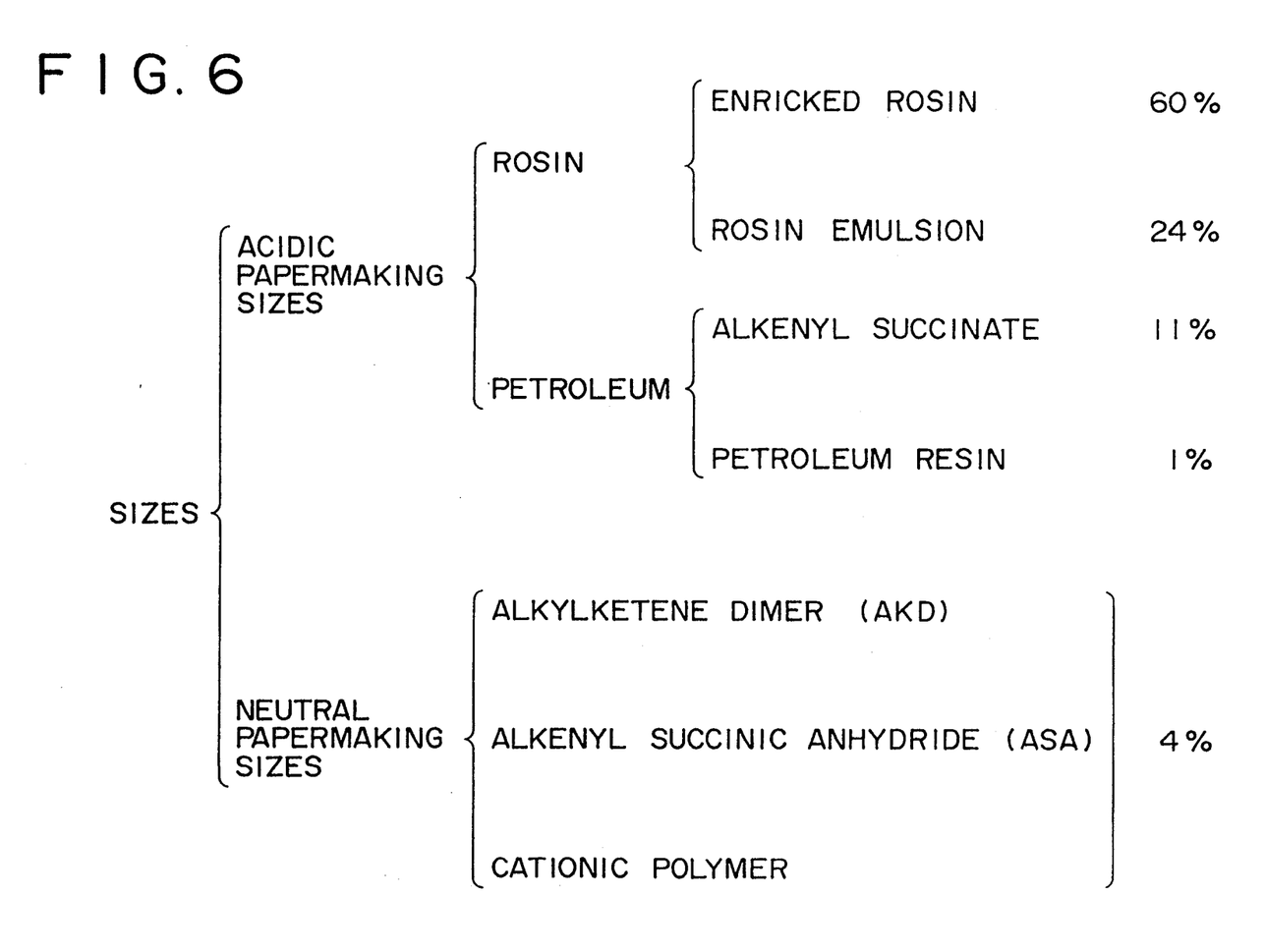
FIG. 6 is a view showing the classification of sizes contained in feedstocks for forming pulp moldings in a second embodiment according to the present invention.

FIG. 6 shows the classification of sizes. Generally, a rosin size is used when an acidic pulp slurry containing aluminum sulfate is used. An appropriate size is selected taking into consideration the pH (hydrogen-ion activity) of the pulp slurry. As shown in FIG. 6, rosin sizes are produced by synthesis using natural colophony and hence rosin sizes are less pollutive than synthetic vinyl acetate which is generally used in producing the conventional pulp molding. Since rosin sizes are not synthetic resins, pulp moldings containing rosin sizes can be deflocculated in water for reclamation.

The following chemical representation shows the components of rosin obtained from the steam distillation of colophony.

The rosin consists of abietic acid as a principal component, and isomers of abietic acid including parastrinic acid, neoabietic acid and levopimaric acid.

Thus, the pulp molding in the second embodiment has improved cushioning characteristics, the physical properties of the pulp molding will not deteriorate even if the pulp molding is used in a high-temperature, high-humidity environment, the pulp molding is capable of being reclaimed and less pollutive than the conventional pulp molding, and the pulp molding is a satisfactory alternative to foam styrene packing materials.

Third Embodiment

A feedstock for forming a pulp molding in the third embodiment includes a pulp slurry of 24% in solid con- Methods of producing a rosin size respectively through the production of maleic acid and fumaric acid are expressed by the following chemical formulas.

tent as a principal component, a mixture of a vinyl acetate emulsion of 5% by weight vinyl acetate content based on pulp and a predetermined quantity of glycerol as a binder, and heat-expandable microcapsules of mean particle diameter of about 100 μm formed of an acrylonitrile resin (F-80E, Matsumoto Yushi K.K.).

Expanded microcapsules obtained by heating the heat-expandable microcapsules are dispensed in the mixture of the vinyl acetate emulsion and glycerol by ultrasonic waves, and then the mixture of the vinyl acetate emulsion, glycerol and the expandable microcapsules, and the pulp slurry are mixed to prepare a feedstock. Feedstocks differing from each other in glycerol content were prepared. The feedstocks of 10%, 30% and 50% by weight in glycerol content were poured in a mold and dried by heating at a temperature of 100° C. to form pulp moldings. Test specimens of 20 mm×20 mm×10 mm in size were sampled from the pulp moldings thus formed, conventional pulp moldings and a foam styrene board of 0.02 in specific gravity. The test specimens were subjected to compression tests, in which the test specimens were compressed at a compression rate of 5 mm/min.

Figure 7:
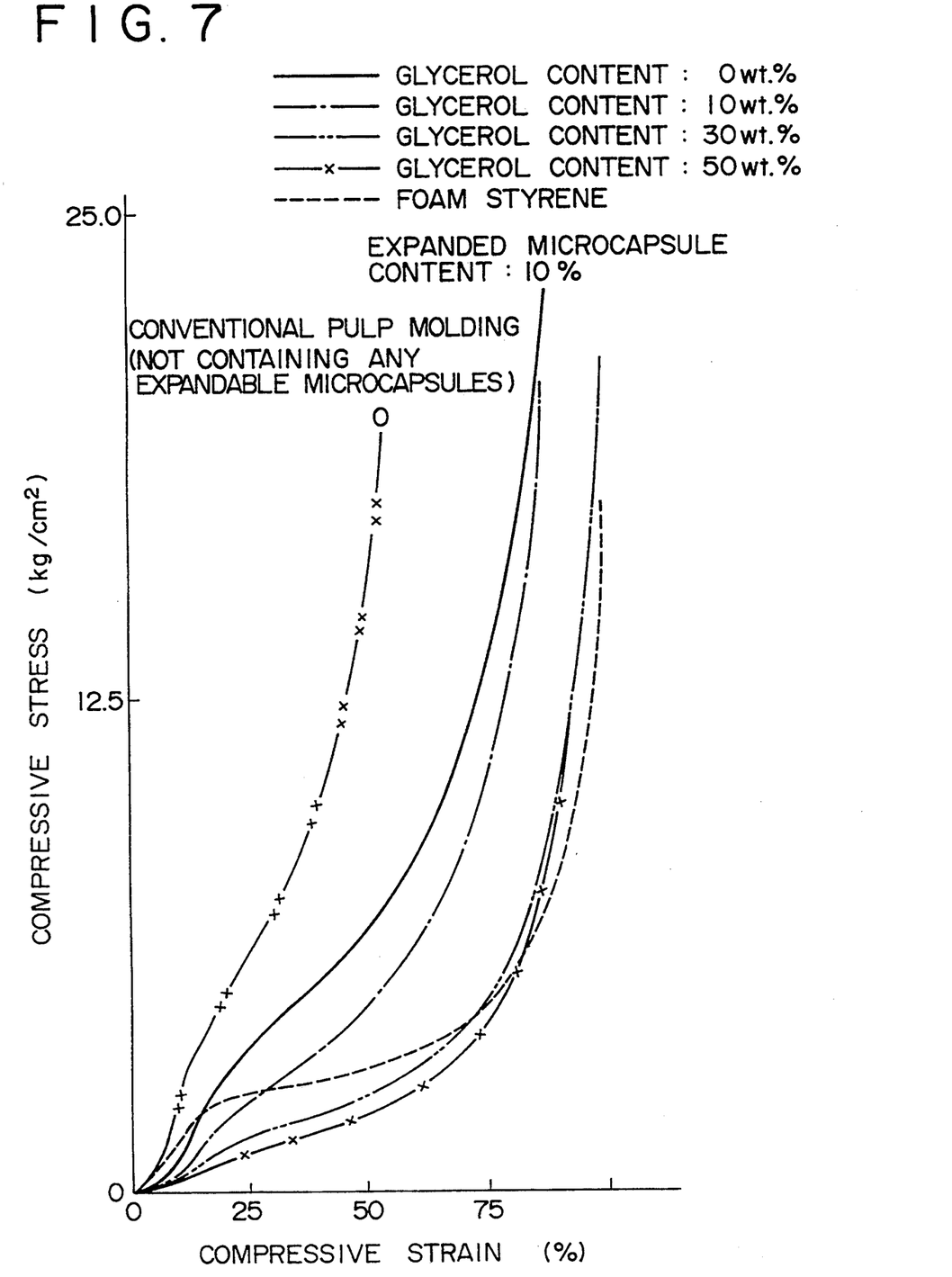
FIG. 7 is a graph showing the measured variation of compressive stress with compressive deformation ratio for pulp moldings in a third embodiment according to the present invention.

FIG. 7 shows the results of the compression tests. As is evident from FIG. 7, compressive stresses induced in the pulp moldings containing the heat-expandable microcapsules are lower than that induced in the conventional pulp molding. Compressive stress induced in the pulp moldings containing glycerol as a pulp plasticizer at a high compressive strain of 75% is relatively small and hence the cushioning effect of the pulp moldings is on the same level as the foam styrene board. The compressive stress induced at a compressive strain of 75% in the pulp molding containing expanded microcapsules of 0.02 in specific gravity and 10% by weight glycerol is smaller than that induced in the conventional pulp molding by 65% and substantially equal to that of the foam styrene board of 0.02 in specific gravity. Glycerol content of 30% by weight has significant effect on the improvement of cushioning characteristics of the pulp moldings in a compressive strain range above 25%.

Figure 8:
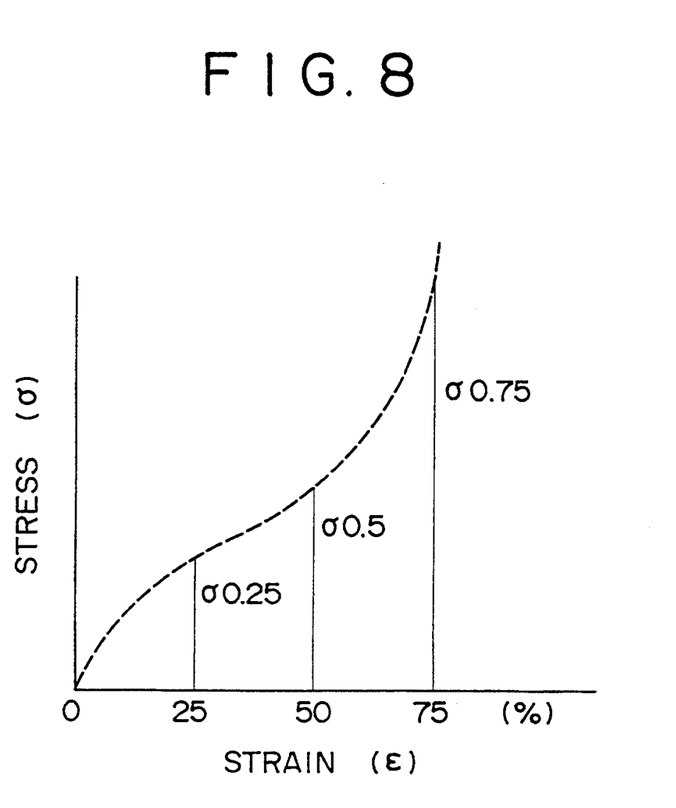
FIG. 8 is a graph showing a stress-strain curve for the pulp moldings in the third embodiment according to the present invention.

Compressive stresses induced in the pulp moldings of the present invention having an expanded microcapsule content of 10% by weight at compressive strains of 25%, 50% and 75% for different glycerol contents are shown in comparison with those induced in the comparative examples, namely, the conventional pulp molding and foam styrene board are shown in Table 5. FIG. 8 is a graph of the relation between strain $\epsilon$ and stress $\sigma$, in which $\sigma 0.25$, $\sigma 0.50$ and $\sigma 0.75$ are stresses at strains of 25%, 50% and 75%, respectively.

TABLE 5

| Test specimens | Glycerol content (wt. %) | Stress (kg/cm$^2$) | | |
|---|---|---|---|---|
| | | $\sigma 0.25$ | $\sigma 0.50$ | $\sigma 0.75$ |
| Pulp moldings of | 0 | 3.5 | 6.6 | 13.4 |
| the invention | 10 | 2.2 | 4.8 | 10.6 |
| | 30 | 1.4 | 2.5 | 4.8 |
| | 50 | 1.1 | 2.0 | 4.3 |
| Conventional pulp | — | 6.0 | 14.8 | ∞ |
| Foam styrene | — | 2.5 | 3.2 | 4.8 |

As is evident from Table 5, the physical properties of the pulp molding can be changed by changing the glycerol content. Preferable glycerol content is in the range of 5 to 50% by weight based on pulp because an excessively large glycerol content reduces the water resistance of the pulp moldings.

The feedstock for forming the pulp moldings of the present invention may be prepared by mixing the heat-expandable microcapsules and other components of the feedstock instead of preparing the same by mixing the expanded microcapsules and the other components of the feedstock, and the heat-expandable microcapsules may be heated to make the same expand after forming the pulp moldings.

Thus, the pulp molding in the third embodiment has higher cushioning characteristics than the conventional pulp molding, is capable of serving as a packing material alternative to the foam styrene packing materials.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A pulp molding composition for forming pulp moldings comprising a uniformly, dispersed slurry including:
   pulp fibers;
   a pulp plasticizer;
   a binder; and
   expandable plastic microspheres present in an amount ranging from approximately 5% to 10% by weight, wherein the pulp molding composition is formable upon exposure to heat.

2. The pulp molding composition of claim 1 further comprising a pulp plasticizer.

3. The pulp molding composition of claim 1 further comprising a rosin size and a water soluble polymer binder.

4. The pulp molding composition of claim 2 wherein the pulp plasticizer is glycerol.

5. The pulp molding composition of claim 1 wherein the binder is selected from the group consisting of chitosan and acrylic resin emulsion.

6. The pulp molding composition of claim 2 wherein the pulp plasticizer is present in an amount of at least 5% by weight.

7. A pulp molding composition for forming pulp moldings comprising a uniformly dispersed slurry including:
   pulp fibers having a solid concentration of 24% by weight;
   a binder;
   expandable plastic microspheres present in an amount ranging from approximately 5% to 10% by weight; and
   a pulp plasticizer, wherein the pulp molding composition is formable upon exposure to heat.

8. The pulp molding composition of claim 7 further comprising a rosin size and a water soluble polymer binder.

9. The pulp molding composition of claim 7 wherein the pulp plasticizer is glycerol.

10. The pulp molding composition of claim 7 wherein the pulp fibers are recycled paper.

11. The pulp molding composition of claim 7 wherein the pulp plasticizer is present in an amount of at least 5% by weight.

* * * * *